US007817559B2

(12) United States Patent
Koodli (10) Patent No.: US 7,817,559 B2
(45) Date of Patent: Oct. 19, 2010

(54) NETWORK NODE POWER CONSERVATION APPARATUS, SYSTEM, AND METHOD

(75) Inventor: Rajeev Koodli, Sunnyvale, CA (US)

(73) Assignee: Nokia Siemens Networks Oy, Espoo (FI)

( * ) Notice: Subject to any disclaimer, the term of this patent is extended or adjusted under 35 U.S.C. 154(b) by 182 days.

(21) Appl. No.: 12/081,187

(22) Filed: Apr. 11, 2008

(65) Prior Publication Data

US 2009/0257355 A1    Oct. 15, 2009

(51) Int. Cl.
*H04L 12/26* (2006.01)
(52) U.S. Cl. ........................ 370/236; 370/203; 340/7.37
(58) Field of Classification Search ................. 370/203; 340/7.37

See application file for complete search history.

(56) References Cited

U.S. PATENT DOCUMENTS

| | | | | |
|---|---|---|---|---|
| 5,831,479 | A * | 11/1998 | Leffel et al. | 330/124 D |
| 6,021,123 | A * | 2/2000 | Mimura | 370/331 |
| 7,542,437 | B1 * | 6/2009 | Redi et al. | 370/311 |
| 2002/0118653 | A1 | 8/2002 | Lomp et al. | |
| 2005/0129009 | A1 | 6/2005 | Kitchin | |
| 2005/0163088 | A1 * | 7/2005 | Yamano et al. | 370/338 |
| 2006/0205396 | A1 * | 9/2006 | Laroia et al. | 455/422.1 |
| 2007/0070919 | A1 * | 3/2007 | Tanaka et al. | 370/254 |
| 2008/0002626 | A1 | 1/2008 | Yokoyama | |

OTHER PUBLICATIONS

International Search Report, PCT/US/ 09/02013 dated May 29, 2009.

* cited by examiner

*Primary Examiner*—Huy D Vu
*Assistant Examiner*—Amy Haspel
(74) *Attorney, Agent, or Firm*—Squire, Sanders & Dempsey L.L.P.

(57) ABSTRACT

A network node self-retirement apparatus, system, and method is provided. The system includes a first network node, a second network node, and a plurality of network nodes. The first network node is configured to monitor a power and traffic level of the first network node and determine an operational weight based thereon. The first network node is further configured to compare the operational weight to a selected operational weight to determine a relationship between the operational weight and the selected operational weight. The first network node is further configured to execute a network node self-retirement procedure when the relationship satisfies a selected condition and to send the operational weight to at least one network node when the relationship does not satisfy the selected condition. The first network node may also determine a network topology based on operational weights received from other network nodes.

19 Claims, 5 Drawing Sheets

NETWORK NODE POWER CONSERVATION APPARATUS, SYSTEM, AND METHOD

BACKGROUND OF THE INVENTION

1. Field of the Invention

The present invention relates generally to communication systems. More specifically, the present invention relates to apparatuses, systems, and methods for network node power conservation.

2. Description of the Related Art

Wireless mesh networks are emerging as alternative mobile broadband access technologies. Such networks often use Institute of Electrical and Electronic Engineers (IEEE) 802.11 access points to provide access to end users. The access points may be connected to, or be part of, a wireless mesh network that includes wireless local area network (WLAN) or World Interoperability for Microwave Access (Wimax) technologies. Though such networks are functional to facilitate communication, currently available wireless mesh networks are limited in their ability to provide power to network nodes throughout the wireless mesh network. While renewable power solutions such as solar-powered batteries have been developed for such networks, little attention has been paid to conserving power that is already available.

SUMMARY OF THE INVENTION

The present invention has been developed in response to the present state of the art, and in particular, in response to the problems and needs in the art that have not yet been fully solved by currently available communication system technologies. Accordingly, the present invention has been developed to provide a network node power conservation apparatus, a system, and a method.

In one aspect of the present invention, a method includes monitoring a power level corresponding to a network node, monitoring a traffic level corresponding to the network node, and determining an operational weight based on the power level and the traffic level. The method may also include comparing the operational weight to a selected operational weight to determine a relationship between the operational weight and the selected operational weight. Additionally, the method may include executing a network node self-retirement procedure when the relationship between the operational weight and the selected operational weight satisfies a selected condition. The method may further include sending the operational weight to at least one network node when the relationship between the operational weight and the selected operational weight does not satisfy the selected condition. Communicating the operational weight to the at least one network node results in being included in a subsequently determined network topology.

In some embodiments, executing the network node self-retirement procedure may include refraining from communicating the operational weight to the at least one network node and entering into a power conservation mode. In certain embodiments, entering into a power conservation mode may include listening for network beacons for a selected time period and terminating the power conservation mode if a network beacon is detected within the selected time period. In certain embodiments, the method may also include exiting the power conservation mode upon detection of a selected event.

In some embodiments, the selected event may include expiration of a selected time period, reception of a network beacon, reception of a wake-up command from an alternative communication medium, or upon achieving a selected power level. The method may also include receiving operational weights corresponding to a plurality of network nodes and determining a network topology when an operational weight of a pre-selected network node is not received during a selected time interval. The network topology may include only network nodes corresponding to received operational weights. In certain embodiments, the power level may include a power level of a network node battery and the selected condition may include the operational weight being greater than or equal to the selected operational weight.

In another aspect of the present invention, an apparatus includes a power monitoring unit configured to monitor a power level corresponding to a network node, a traffic monitoring unit configured to monitor a traffic level corresponding to the network node, and an operational weight determining unit configured to determine an operational weight based on the power level and the traffic level. The apparatus may also include a comparing unit configured to compare the operational weight to a selected operational weight to determine a relationship between the operational weight and the selected operational weight. Additionally, the apparatus may include a self-retirement unit configured to execute a network node self-retirement procedure when the relationship between the operational weight and the selected operational weight satisfies a selected condition. The apparatus may further include a communication unit configured to send the operational weight to at least one network node when the relationship between the operational weight and the selected operational weight does not satisfy the selected condition. Communicating the operational weight to the network nodes may result in being included in a subsequently determined network topology.

In certain embodiments, the network node self-retirement procedure may include refraining from communicating the operational weight to the at least one network node and entering into a power conservation mode. In some embodiments, the power conservation mode may include listening for network beacons for a selected time period and terminating the power conservation mode if a network beacon is detected within the selected time period. In certain embodiments, the self-retirement unit may also be configured to exit the power conservation mode upon detection of a selected event.

In some embodiments, the selected event may include expiration of a selected time period, reception of a network beacon, reception of a wake-up command from an alternative communication medium, or upon achieving a selected power level corresponding to the network node. In certain embodiments, the communication unit is further configured to receive operational weights corresponding to a plurality of network nodes. In such embodiments, a network topology determining unit may be configured to determine a network topology when an operational weight of a selected network node is not received during a selected time interval, wherein the network topology may include only of network nodes corresponding to received operational weights. In certain embodiments, the power level may include a power level of a network node battery. In some embodiments, the selected condition may include the operational weight being greater than or equal to the selected operational weight.

In another aspect of the present invention, a computer program is embodied on a computer-readable medium. The computer program may be configured to control a processor to perform operations that include monitoring a traffic level corresponding to the network node, determining an operational weight based on the power level and the traffic level, and comparing the operational weight to a selected operational weight to determine a relationship between the operational weight and the selected operational weight. The operations may also include executing a network node self-retirement procedure when the relationship between the operational weight and the selected operational weight satisfies a selected condition. The operations may further include sending the operational weight to at least one network node when the relationship between the operational weight and the selected operational weight does not satisfy the selected condition. Communicating the operational weight to the at least one network node may result in being included in a subsequently determined network topology.

In another aspect of the present invention, an apparatus includes a power level monitoring means for monitoring a power level corresponding to a network node, a traffic monitoring means for monitoring a traffic level corresponding to the network node, and an operational weight determining means for determining an operational weight based on the power level and the traffic level. The apparatus may also include a comparing means for comparing the operational weight to a selected operational weight to determine a relationship between the operational weight and the selected operational weight. Additionally, the apparatus may include an executing means for executing a network node self-retirement procedure when the relationship between the operational weight and the selected operational weight satisfies a selected condition. The apparatus may further include a sending means for sending the operational weight to at least one network node when the relationship between the operational weight and the selected operational weight does not satisfy the selected condition. Communication of the operational weight to the at least one network node may result in being included in a subsequently determined network topology.

In another aspect of the present invention, a system include a first network node, a second network node, and a plurality of network nodes. The first network node may be configured to monitor a power level corresponding to a network node, monitor a traffic level corresponding to the network node, and determine an operational weight based on the power level and the traffic level. The first network node may also be configured to compare the operational weight to a selected operational weight to determine a relationship between the operational weight and the selected operational weight. The first network node may further be configured to execute a network node self-retirement procedure when the relationship between the operational weight and the selected operational weight satisfies a selected condition. The first network node may also be configured to send the operational weight to at least one network node when the relationship between the operational weight and the selected operational weight does not satisfy the selected condition.

The second network node may be configured to receive operational weights corresponding to at least some of the plurality of network nodes. The second network node may also be configured to determine a network topology when an operational weight of at least some of the plurality of network nodes is not received during a selected time interval. The network topology may include only network nodes corresponding to received operational weights.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENT(S)

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in the attached Figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the terms, data, packet, and/or datagram have been used in the description of the present invention, the invention has import to many types of network data. For purposes of this invention, the term data includes packet, cell, frame, datagram, bridge protocol data unit packet, packet data and any equivalents thereof.

Figure 1:
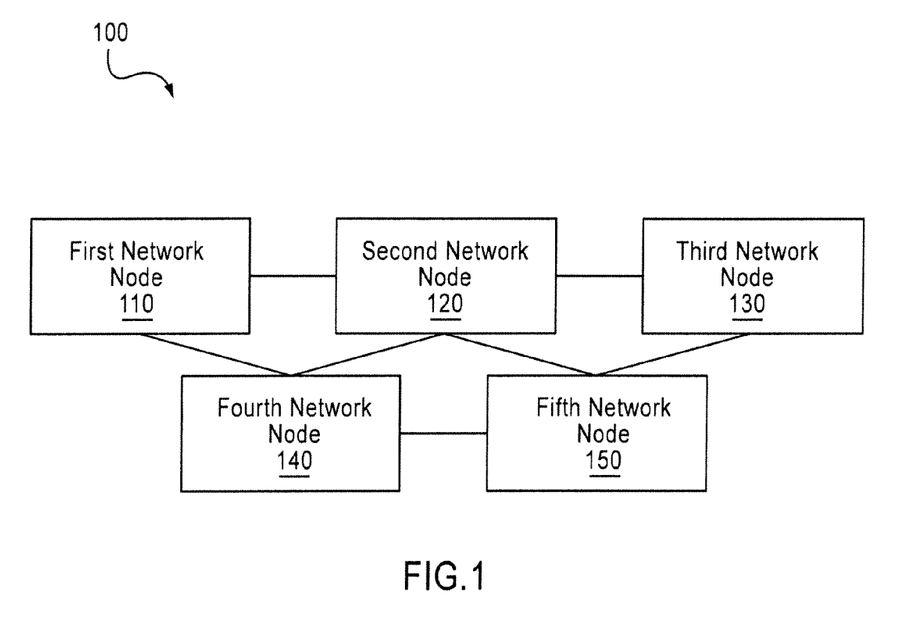
FIG. 1 is a block diagram of a network node power conservation system, in accordance with one embodiment of the present invention.

FIG. 1 is a block diagram of a network node power conservation system 100, in accordance with one embodiment of the present invention. The depicted system 100 includes a first network node 110, a second network node 120, a third network node 130, a fourth network node 140, and a fifth network node 150. The network nodes 110, 120, 130, 140, and 150 of the system 100 cooperate to enable network node power conservation.

In certain embodiments, the first network node 110 may monitor a power level and a data traffic level of the first network node 110. In some embodiments, the first network node 110 may also determine an operational weight corresponding to the first network node based on the power and traffic levels monitored. In certain embodiments, the first network node 110 may compare the operational weight to a selected operational weight to determine a relationship between the operational weight and the selected operational weight and to determine whether a selected condition is satisfied.

In some embodiments, if the selected condition is satisfied, the first network node 110 may execute a self-retirement procedure which may include being excluded from future network activity and executing power conservation operations. Also, in certain embodiments, if the selected condition is not satisfied, the first network node may send the operational weight to other network nodes in the system 100. For example, the first network node 110 may send the operational weight to the second, third, fourth, and fifth network nodes 120, 130, 140, and 150.

In certain embodiments, the second network node 120 may receive operational weights corresponding to at least some of the other network nodes. In some embodiments, if the second network node 120 does not receive operational weights of all of the network nodes 110, 130, 140, and 150, then the second network node 120 determines a network topology that only includes the network nodes that correspond to the operational weights received.

For example, if each of the network nodes 130, 140, and 150, except for the first network node 110, sends an operational weight to the second network node 120, then the second network node 120 may determine a new network topology that includes the third, fourth, and fifth network nodes 130, 140, and 150 but excludes the first network node 110. Doing so enables the first network node to execute a self-retirement procedure that may include "retiring" from the current network topology and entering a power conservation mode. As such, the network nodes 110, 120, 130, 140, and 150 of the system 100 cooperate to enable network node power conservation.

The network nodes 110, 120, 130, 140, and 150 may collectively create a wireless mesh network of a wireless local area network (WLAN) and may each be embodied as a wireless network node and/or access point. Indeed, the network nodes may operate in accordance with Institute of Electrical and Electronic Engineers (IEEE) 802.11, World Interoperability for Microwave Access (Wimax), or related technologies. In certain embodiments, the network nodes 110, 120, 130, 140, and 150 may be partially or entirely battery powered.

One skilled in the art will appreciate that the functions and/or operations attributed to the any single network node of the system 100 via the foregoing description are intended for example purposes only and could be extended to any other node in the system 100. Additionally, one skilled in the art will appreciate that the depicted system 100 includes only five network nodes; however, the present invention could readily be directed to a system of any number of network nodes. Furthermore, one skilled in the art will appreciate that any of the network nodes 110, 120, 130, 140, and 150 could take on operations and/or features described elsewhere in this disclosure.

Figure 2:
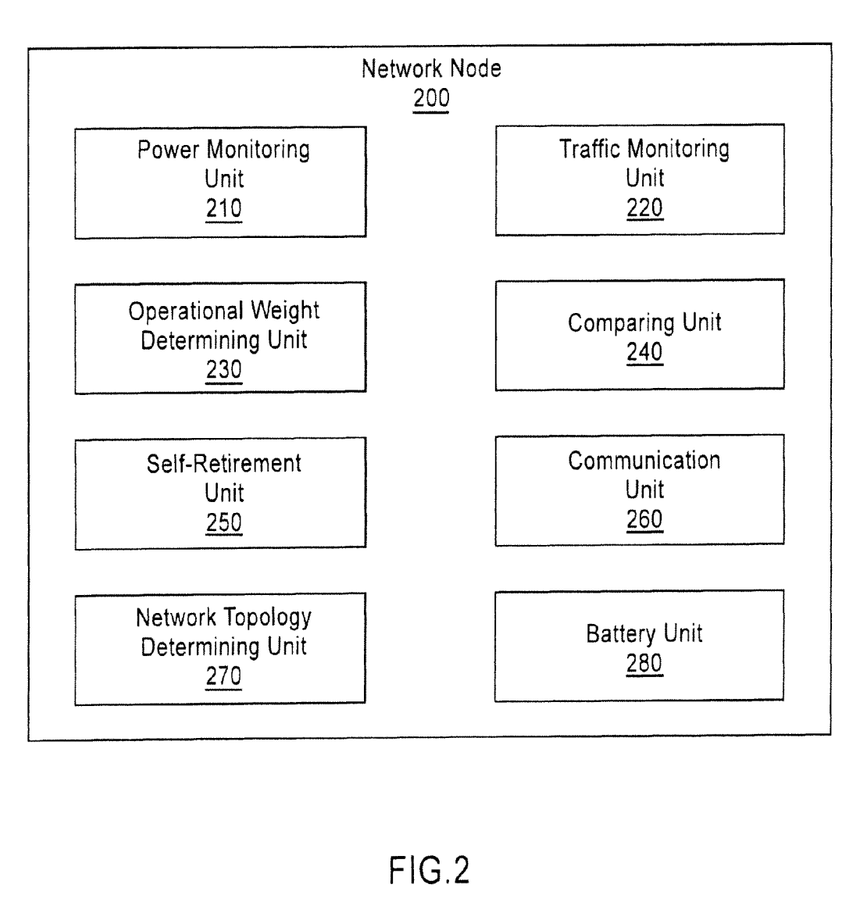
FIG. 2 is a block diagram of a network node, in accordance with one embodiment of the present invention.

FIG. 2 is a block diagram of a network node, in accordance with one embodiment of the present invention. The depicted network node 200 includes a power monitoring unit 210, a traffic monitoring unit 220, an operational weight determining unit 230, a comparing unit 240, a self-retirement unit 250, a communication unit 260, a network topology determining unit 270, and a battery unit 280. The various units 210, 220, 230, 240, 250, 260, 270, 280 may cooperate to enable network node power conservation in accordance with the present invention.

In certain embodiments, the power monitoring unit 210 may be configured to monitor a power level corresponding to a network node. In some embodiments, the power level corresponds to a network node battery 280 that is configured to power the network node 200. In some embodiments, the traffic monitoring unit 220 is configured to monitor the amount of data traffic that the network node 200 is experiencing. One skilled in the art will appreciate that monitoring a power level and a traffic level may include various techniques and technologies known in the art and as is not meant to limit the scope of the present invention in any way.

In certain embodiments, the operational weight determining unit 230 may be configured to determine an operational weight based on the monitored power and traffic levels. The description of FIG. 4, below, provides additional discussion on determining the operational weight. In certain embodiments, the comparing unit 240 is configured to compare the operational weight of the network node 200 with a selected operational weight to determine whether a relationship between the operational weight and the selected operational weight satisfies a selected condition.

The selected operational weight may include any value designated to achieve the objectives and constraints relevant to a particular embodiment. The selected operational weight may represent a power and traffic threshold for retiring the network node 200. In certain embodiments, a selected condition may include the operational weight being greater than or equal to the selected operational weight. In such embodiments, the selected condition is satisfied when the operational weight is greater than or equal to the selected operational weight.

In some embodiments, the self-retirement unit 250 is configured to execute a self-retirement procedure if the selected condition is satisfied. In certain embodiments, a self-retirement procedure may include refraining from communicating the operational weight to another network node (not shown) and entering into a power conservation mode. A power conservation mode may include a sleep mode, a hibernation mode, or other state of operation with a decreased power requirement. In some embodiments, the power conservation mode may include listening for network beacons for a selected time period and terminating the power conservation mode if a network beacon is detected within the selected time period.

In certain embodiments, the self-retirement unit 250 may also be configured to exit the power conservation mode upon detection of a selected event. A selected event may include, but is not limited to, of a selected time period, reception of a network beacon, reception of a wake-up command from an alternative communication medium, or upon achieving a selected power level corresponding to the network node. Accordingly, the network node 200 may be configured to not only enter into a variety of power conservation modes, but may also be configured to exit from the power conservation modes.

In some embodiments, the communication unit 260 may be configured to send the operational weight of the network node 200 to another network node (not shown) when the relationship between the operational weight and the selected operational weight does not satisfy the selected condition. For example, the communication unit 260 may send the operational weight to another network node if the operational weight of the network node 200 is less than the selected operational weight. As detailed in discussion of FIG. 2, sending the operational weight of the network node 200 to another network node may result in the network node 200 being part of a subsequently generated network topology. As such, the network node 200 enables the cooperative formation of subsequent network topologies.

In certain embodiments, the communication unit 260 is also configured to receive operational weights corresponding to a plurality of network nodes. In some embodiments, the network topology determining unit 270 is configured to determine a network topology when an operational weight of a selected network node is not received during a selected time interval. In certain embodiments, the network topology includes only the network nodes that correspond to the received operational weights. FIG. 1 and the accompanying description provides a more detailed discussion of the formation of the network topology based on the network nodes that have sent operational weights to the network node 200.

Many of the functional units described in this specification have been labeled as units, in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices.

Figure 3:
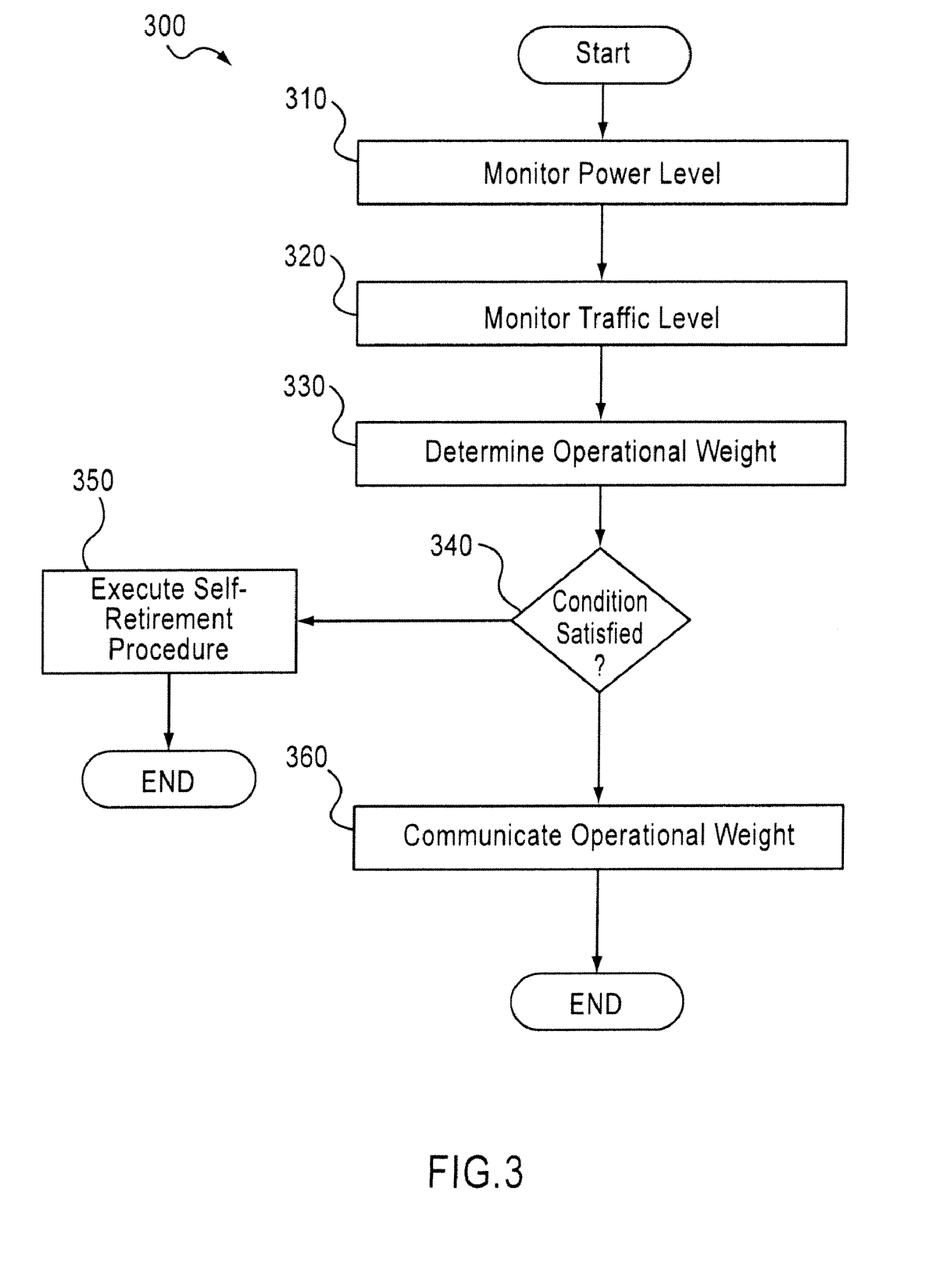
FIG. 3 is a flow chart diagram of a network node power conservation method, in accordance with one embodiment of the present invention.

FIG. 3 is a flow chart diagram of a network node power conservation method 300, in accordance with one embodiment of the present invention. The depicted method 300 includes monitoring 210 a power level, monitoring 320 a traffic level, determining 330 an operational weight, determining 340 whether a selected condition is satisfied, executing 350 a network nod self-retirement procedure, sending 360 an operational weight. The operations of the method 300 cooperate to enable network node power conservation.

Monitoring 310 a power level may include a network node monitoring a power level of a battery that powers the network node. Monitoring 320 a traffic level may include monitoring an amount of data that arrives at a network node. Determining 330 an operational weight may include determining an operational weight of a network node based upon the monitored power and traffic levels. In some embodiments, determining 330 an operational weight may be facilitated by the following equation:

$$W = \left(\frac{1}{\alpha \cdot B}\right) + \left(\frac{1}{(1-\alpha) \cdot T}\right).$$

Regarding the equation, "W" may represent the operational weight, "α" may represent a system-wide configurable non-negative real number, "B" may represent an available battery power, and "T" may represent an aggregate traffic level at the node over a time. By choosing a suitably, the weight can be balanced between the battery and aggregate traffic variables. The higher the battery reserve (B) and traffic (T) at a network node, the lower the operational weight (W). Also, if traffic (T) is higher, but the battery reserve (B) is lower, then the operational weight (W) tends to be higher when α is chosen to be closer to 1. This means that the battery reserve (B) weighs more heavily on the computation of W the traffic (T). When both the battery reserve (B) and the traffic (T) are lower, then the operational weight (W) is naturally higher.

When the batter power, B, is equal to zero, the network node is switched off. When the traffic (T) is equal to zero or when α is equal to 1, then the following equation may be used:

$$W = \left(\frac{1}{\alpha \cdot B}\right).$$

One skilled in the art will appreciate that many equations may be used in determining the operational weight of the network node and that the present invention is not limited to the foregoing equations.

Determining 340 whether a selected condition is satisfied may include comparing whether the operational weight is greater than or equal to a selected operational weight. If the selected condition is satisfied, the method 300 continues by executing 350 a network node self-retirement procedure which may include refraining from communicating the operational weight to another network node and entering into a power conservation mode such as a sleep or hibernation mode. If, however, the condition is satisfied, the method 300 continues by communicating 350 the operational weight. Communicating 350 the operational weight may include a network node communicating the operational weight to a selected network node such that the network node will be included in a subsequently determined network topology.

Figure 4:
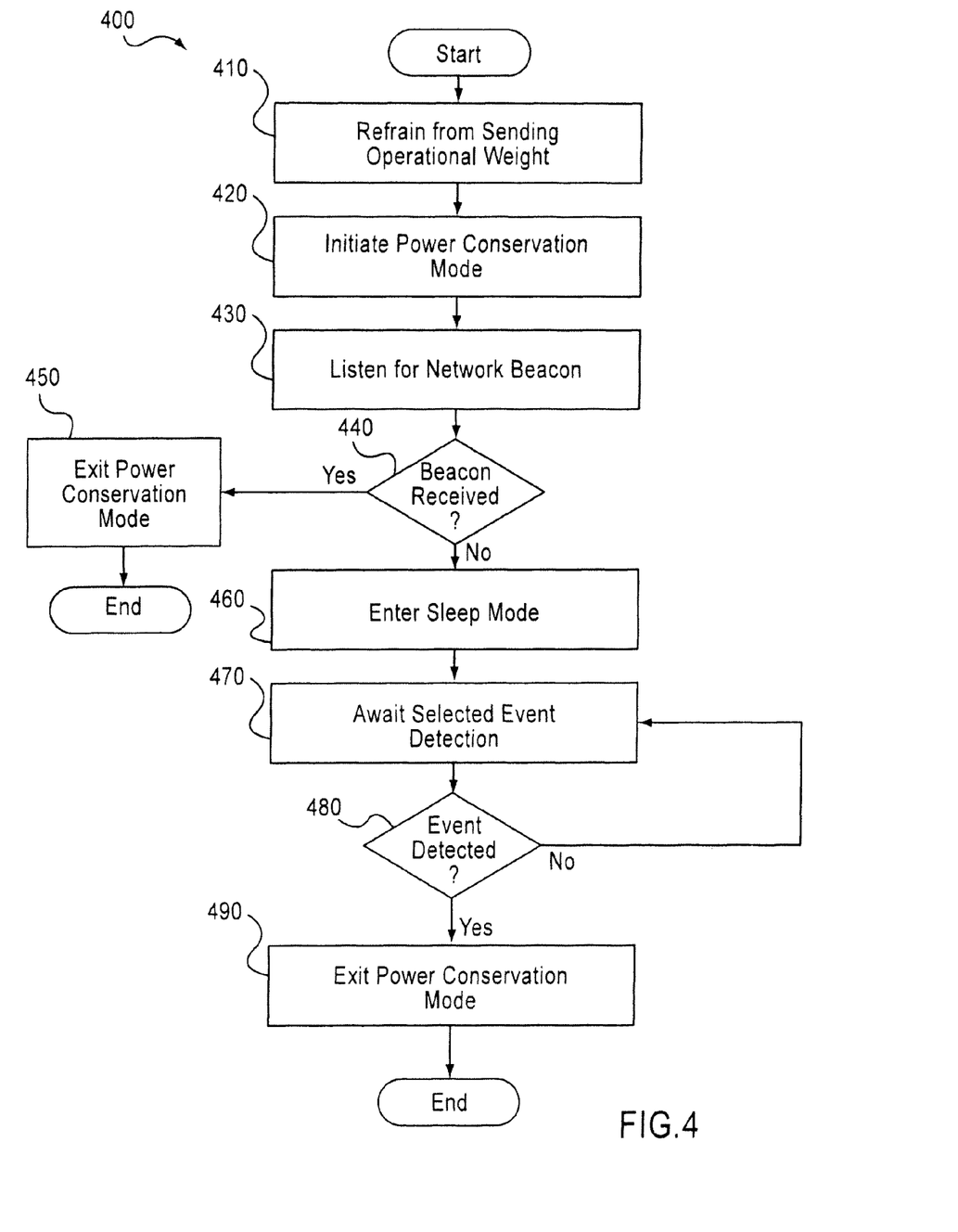
FIG. 4 is a flow chart diagram of a network node self-retirement method, in accordance with one embodiment of the present invention.

FIG. 4 is a flow chart diagram of a network node power conservation method 400, in accordance with one embodiment of the present invention. The method 400 includes refraining 400 from sending operational weight, initiating 420 a power conservation mode, listening 430 for a network beacon, determining 440 whether a network beacon is received, exiting 450 a power conservation mode, entering 460 a sleep mode, awaiting 470 a selected event, determining 480 whether a selected event has occurred, and exiting 490 the power conservation mode. The operations of the method 400 enable a network node to enter into, and exit from, a power conservation mode.

Refraining from sending an operational weight may include a network node not sending a recently determined operational weight to one or more network nodes. Initiating 420 a power conservation mode may include executing preliminary operations for entering into a sleep mode, a hibernation mode, or other mode that requires a reduced amount of power. Listening 430 for a network beacon may include listening for a communication from another network node to exit the power conservation mode during a selected time interval. If it is determined 440 that a network beacon has been received, then the method 400 continues by exiting 450 the power conservation mode to resume standard network node operations.

If it is determined 400 that a network beacon has not been received, then the method 400 continues by entering 460 a sleep mode. The method 400 then continues by awaiting 470 for the detection of a selected event such as the expiration of a selected time period, reception of a network beacon, reception of a wake-up command from an alternative communication medium, or upon achieving a selected power level corresponding to the network node. If it is determined 480 that a selected event has occurred, then the method 400 continues by exiting 490 the power conservation mode and resuming normal network node operations.

Figure 5:
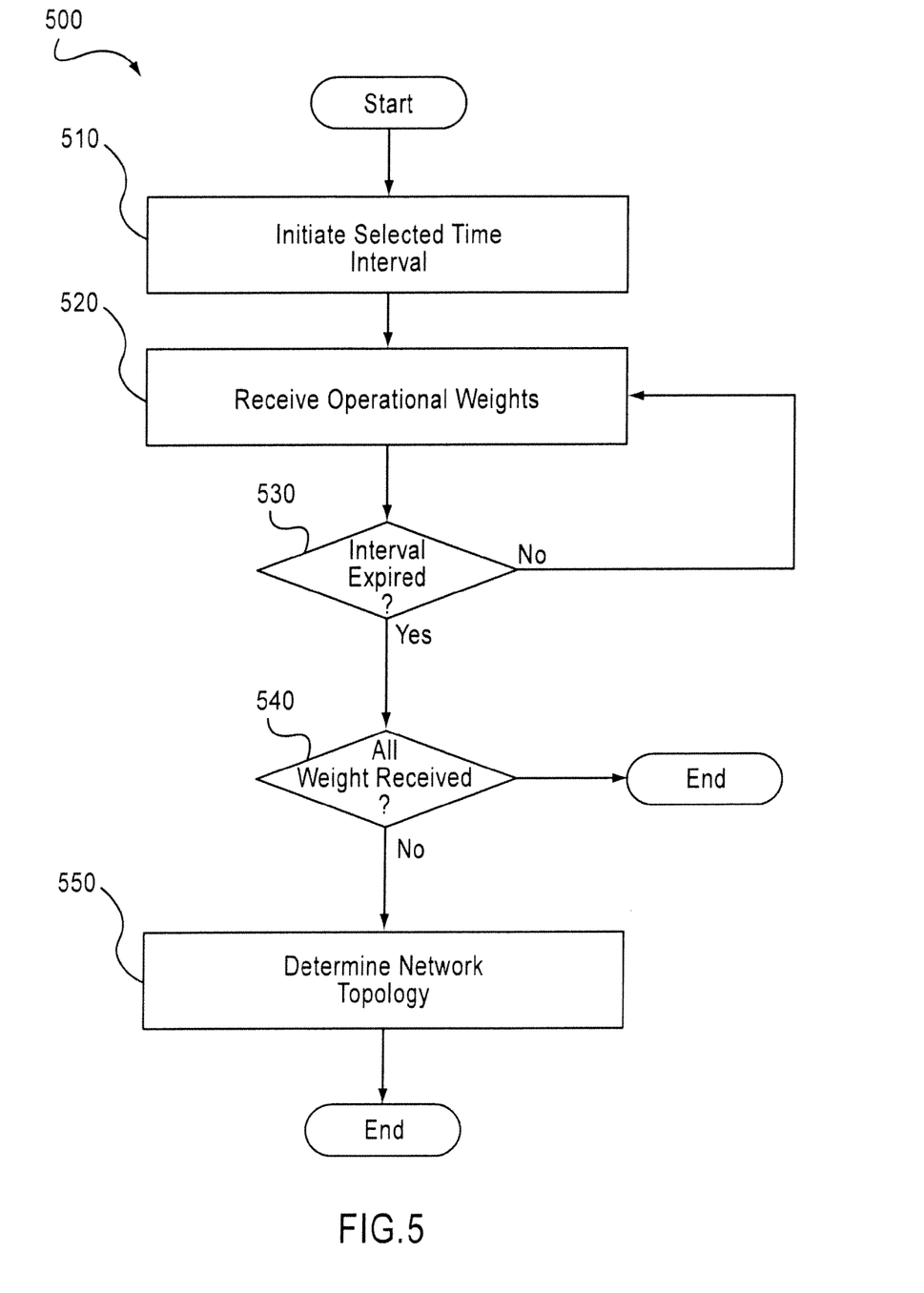
FIG. 5 is a flow chart diagram of a method for determining a network topology, in accordance with one embodiment of the present invention.

FIG. 5 is a flow chart diagram of a method 500 for determining a network topology, in accordance with one embodiment of the present invention. The depicted method 500 includes initiating a selected time interval, receiving 520 operational weights, determining 530 whether the selected time interval has expired, determining 540 whether all operational weights have been received, and determining 550 a network topology. The operations of the method 500 enable determination of a new network topology in accordance with the present invention.

Initiating 510 a selected time interval may include a network node initiating a repeating time interval that is designated for receiving operational weights from other network nodes. The duration of the time interval may vary depending upon the objectives and restraints of a particular network node or network mesh. Receiving 520 operational weights may include the network node receiving operational weights from a plurality of network nodes in a network mesh wherein the network node resides.

If it is determined 530 that the time interval has not expired, then the method 500 continues by receiving 520 operational weights. However, if it is determined 530 that the selected time interval has expired, then the method 500 continues by determining 540 whether all operational weights have been received from a selected plurality of network nodes. For example, the network node may have a group of network nodes stored in a local memory, and when operational weights are received, the network node may correlate each operational weight received with the correct network node. Once the time interval has expired, the network node may determine whether any network node represented in memory has not communicated an operational weight.

If all the network nodes stored in memory have sent an operational weight, then the method ends because there is no need to determine a new network topology. However, if it is determined 540 that at least one of the network nodes in memory have not sent an operational weight, then the method 500 continues by determining 550 a network topology that only includes the network nodes of the operational weights received. Due to the lack of the operational weight of one or more network nodes, it may be assumed that those network nodes have initiated a self-retirement procedure and are not to be included in future network traffic. As such, the method 500 enables determining of new network nodes in response to the self-retirement procedures of other network nodes.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

I claim:

1. A method comprising:
   monitoring a power level corresponding to a network node;
   monitoring a traffic level corresponding to the network node;
   determining an operational weight based on the power level and the traffic level;
   comparing the operational weight to a selected operational weight to determine a relationship between the operational weight and the selected operational weight;
   executing a network node self-retirement procedure when the relationship between the operational weight and the selected operational weight satisfies a selected condition; and
   sending the operational weight to at least one network node when the relationship between the operational weight and the selected operational weight does not satisfy the selected condition, wherein the communicating of the operational weight to the at least one network node results in being included in a subsequently determined network topology.

2. The method of claim 1, wherein executing the network node self-retirement procedure comprises refraining from communicating the operational weight to the at least one network node and entering into a power conservation mode.

3. The method of claim 2, wherein entering into a power conservation mode comprises listening for network beacons for a selected time period and terminating the power conservation mode if a network beacon is detected within the selected time period.

4. The method of claim 2, further comprising:
   exiting the power conservation mode upon detection of a selected event.

5. The method of claim 4, wherein the selected event comprises expiration of a selected time period, reception of a network beacon, reception of a wake-up command from an alternative communication medium, or upon achieving a selected power level corresponding to the network node.

6. The method of claim 1, further comprising:
   receiving operational weights corresponding to a plurality of network nodes,
   determining a network topology when an operational weight of a pre-selected network node is not received during a selected time interval, wherein the network topology comprises only of network nodes corresponding to received operational weights.

7. The method of claim 1, wherein the power level comprises a power level of a network node battery.

8. The method of claim 1, wherein the selected condition comprises the operational weight being greater than or equal to the selected operational weight.

9. An apparatus comprising:
a power monitoring unit configured to monitor a power level corresponding to a network node;
a traffic monitoring unit configured to monitor a traffic level corresponding to the network node;
an operational weight determining unit configured to determine an operational weight based on the power level and the traffic level;
a comparing unit configured to compare the operational weight to a selected operational weight to determine a relationship between the operational weight and the selected operational weight;
a self-retirement unit configured to execute a network node self-retirement procedure when the relationship between the operational weight and the selected operational weight satisfies a selected condition; and
a communication unit configured to send the operational weight to at least one network node when the relationship between the operational weight and the selected operational weight does not satisfy the selected condition, wherein communication of the operational weight to the at least one network node results in being included in a subsequently determined network topology.

10. The apparatus of claim 9, wherein the network node self-retirement procedure comprises refraining from communicating the operational weight to the at least one network node and entering into a power conservation mode.

11. The apparatus of claim 10, wherein the power conservation mode comprises listening for network beacons for a selected time period and terminating the power conservation mode if a network beacon is detected within the selected time period.

12. The apparatus of claim 10, wherein the self-retirement unit is further configured to exit the power conservation mode upon detection of a selected event.

13. The apparatus of claim 12, wherein the selected event comprises expiration of a selected time period, reception of a network beacon, reception of a wake-up command from an alternative communication medium, or upon achieving a selected power level corresponding to the network node.

14. The apparatus of claim 9, wherein the communication unit is further configured to receive operational weights corresponding to a plurality of network nodes, and the apparatus further comprising:
a network topology determining unit configured to determine a network topology when an operational weight of a selected network node is not received during a selected time interval, wherein the network topology comprises only of network nodes corresponding to received operational weights.

15. The apparatus of claim 9, wherein the power level comprises a power level of a network node battery.

16. The apparatus of claim 9, wherein the selected condition comprises the operational weight being greater than or equal to the selected operational weight.

17. A computer program embodied on a non-transitory computer-readable medium, the computer program configured to control a processor to perform operations comprising:
monitoring a power level corresponding to a network node;
monitoring a traffic level corresponding to the network node;
determining an operational weight based on the power level and the traffic level;
comparing the operational weight to a selected operational weight to determine a relationship between the operational weight and the selected operational weight;
executing a network node self-retirement procedure when the relationship between the operational weight and the selected operational weight satisfies a selected condition; and
sending the operational weight to at least one network node when the relationship between the operational weight and the selected operational weight does not satisfy the selected condition, wherein the communicating of the operational weight to the at least one network node results in being included in a subsequently determined network topology.

18. An apparatus, comprising:
power level monitoring means for monitoring a power level corresponding to a network node;
traffic monitoring means for monitoring a traffic level corresponding to the network node;
operational weight determining means for determining an operational weight based on the power level and the traffic level;
comparing means for comparing the operational weight to a selected operational weight to determine a relationship between the operational weight and the selected operational weight;
executing means for executing a network node self-retirement procedure when the relationship between the operational weight and the selected operational weight satisfies a selected condition; and
sending means for sending the operational weight to at least one network node when the relationship between the operational weight and the selected operational weight does not satisfy the selected condition, wherein communication of the operational weight to the at least one network node results in being included in a subsequently determined network topology.

19. A system, comprising:
a first network node;
a second network node;
a plurality of network nodes, wherein
the first network node is configured to,
monitor a power level corresponding to a network node,
monitor a traffic level corresponding to the network node,
determine an operational weight based on the power level and the traffic level,
compare the operational weight to a selected operational weight to determine a relationship between the operational weight and the selected operational weight,
execute a network node self-retirement procedure when the relationship between the operational weight and the selected operational weight satisfies a selected condition, and
send the operational weight to at least one network node when the relationship between the operational weight and the selected operational weight does not satisfy the selected condition, and
the second network node is configured to,
receive operational weights corresponding to at least some of the plurality of network nodes, and
determine a network topology when an operational weight of at least some of the plurality of network nodes is not received during a selected time interval, wherein the network topology comprises only of network nodes corresponding to received operational weights.

* * * * *